April 13, 1954  G. V. CONSTANTAKIS  2,675,073
TIRE TREAD LACERATING METHOD
Filed Feb. 9, 1952
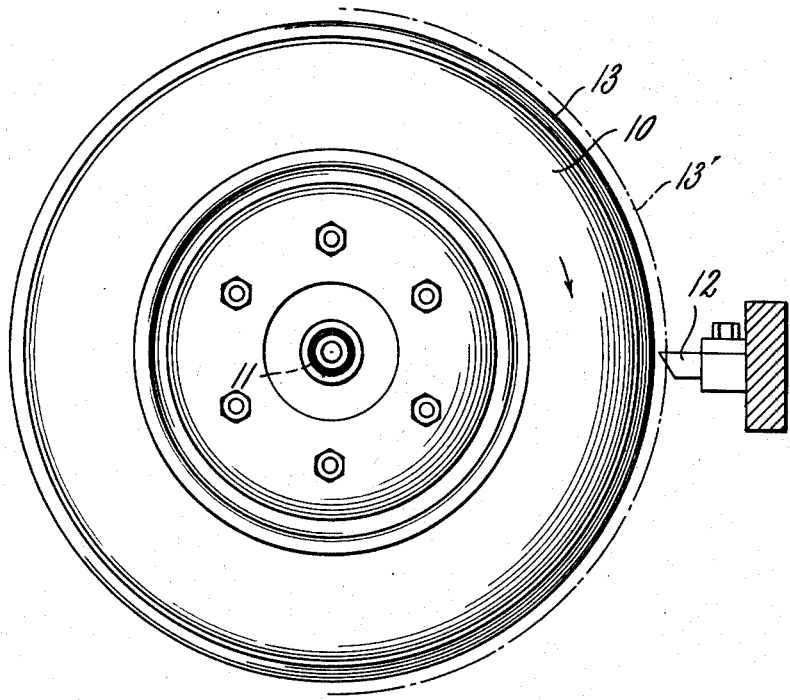
INVENTOR.
GEORGE V. CONSTANTAKIS
BY
ATTORNEY

Patented Apr. 13, 1954

2,675,073

UNITED STATES PATENT OFFICE 2,675,073

TIRE TREAD LACERATING METHOD

George V. Constantakis, Allen Park, Mich., assignor to United States Rubber Company, New York, N. Y., a corporation of New Jersey Application February 9, 1952, Serial No. 270,881

4 Claims. (Cl. 164—17)

This invention relates to a method of lacerating the tread of a rubber tire to increase the traction thereof.

It is one object of the invention to provide a method by which a tire tread may be grooved, slitted or texturized without removing the tire from the automobile.

It is another object to provide a method of lacerating the tread of a tire which may be performed without the use of expensive or complicated equipment.

Another object of the invention is to provide a method of lacerating the tread of a tire in which the lacerating tool is held stationary and the tread fed against the tool by the radial expansion of the tire due to centrifugal force.

Other objects of the invention will become apparent from the following description when read in conjunction with the accompanying drawing; wherein the drawing is an elevational view of a tire being lacerated according to the method of the present invention.

Referring to the drawing, a tire 10 is mounted for rotation about its axis on a suitable mandrel or shaft 11. In the case where the tire is mounted on an automobile, the wheel carrying the tire to be lacerated may be merely jacked up so that it is free to rotate.

A tread lacerating tool 12 is then brought adjacent the tread of the tire and held stationary in this position. The tire is then rotated about its axis by any suitable source of power (not shown). As the tire rotates the tread portion 13 thereof expands radially outwardly under the influence of the centrifugal force created by the rotation as shown by the dotted lines 13' in the drawing. This expansion provides the necessary feeding action of the tread against the lacerating tool and the tread is lacerated thereby.

By utilizing the radial expansion of the tire due to the centrifugal force to feed the tread against the lacerating tool, the necessity of complicated expensive feeding mechanism is eliminated. Any suitable power source may be used to rotate the tire. When the tire is mounted on the driving wheel of an automobile, the wheel and tire can be rotated by operation of the engine. The speed of rotation of the tire and the effective length of the cutting elements of the lacerating tool determine the depth to which the tread is lacerated.

As the cutting elements cut deeper and closer to the reinforcing cords of the tire there is a marked change in the pitch of the hum created during the lacerating operation. When they approach the cords, the hum increases substantially in pitch.

By listening for this change in pitch of the hum created during the lacerating operation, cutting of the reinforcing cords can be prevented by stopping rotation of the tire at this time.

Any suitable lacerating tool may be used such as grooving tools which are well known in the art. The tools shown in my copending applications, Serial No. 270,882 filed February 9, 1952 and Serial No. 270,883 filed February 9, 1952 are particularly useful in carrying out the method of the present invention particularly when the tire is mounted on an automobile.

From the above description it can be seen that there is provided a simple method for lacerating the tread of the tire to increase the traction thereof which requires no expensive or complicated equipment and which may be used to lacerate the tread of a tire while it is still mounted on an automobile.

It is to be understood that the above description is for the purpose of illustration only and not by way of limitation and that changes in modification may be made therein without departing from the spirit and scope of the invention.

Having thus described my invention, what I claim and desire to protect by Letters Patent is:

1. The method of lacerating the tread of a rubber tire to increase the traction thereof, comprising, holding a lacerating tool adjacent the tread of a tire, and rotating the tire about its axis to expand the tire radially by centrifugal force to thereby feed the tread of the tire against the lacerating tool to lacerate the tread.

2. The method of lacerating the tread of a rubber tire to increase the traction thereof while the tire is mounted on an automobile comprising, jacking up the wheel carrying the tire to be lacerated so that it is freely rotatable, holding a lacerating tool adjacent the tread of the tire and rotating the tire to expand the tire radially by centrifugal force to thereby feed the tread of the tire against the lacerating tool to lacerate the tread.

3. The method of lacerating the tread of a rubber tire to increase the traction thereof while the tire is mounted on an automobile comprising, jacking up the wheel carrying the tire to be lacerated so that it is freely rotatable, holding the lacerating tool adjacent the tread of the tire and rotating the tire by operation of the engine of the automobile to expand the tire radially by centrifugal force to thereby feed the tread of the tire against the lacerating tool to lacerate the tread.

4. The method of lacerating the tread of a rubber tire having reinforcing cord to increase the traction thereof, comprising, holding a lacerating tool adjacent the tread of a tire, rotating the tire about its axis to expand the tire radially by centrifugal force to thereby feed the tread of the tire against the lacerating tool to lacerate the tread, and stopping the rotation of the tire when there is a marked increase in the pitch of the hum during the lacerating operation.

References Cited in the file of this patent

UNITED STATES PATENTS

| Number | Name | Date |
|---|---|---|
| 1,404,118 | Hargraves | Jan. 17, 1922 |
| 1,986,587 | Luddington | Jan. 1, 1935 |

FOREIGN PATENTS

| Number | Country | Date |
|---|---|---|
| 188,917 | Great Britain | Nov. 23, 1922 |
| 207,174 | Switzerland | Dec. 16, 1939 |